Figure 1:
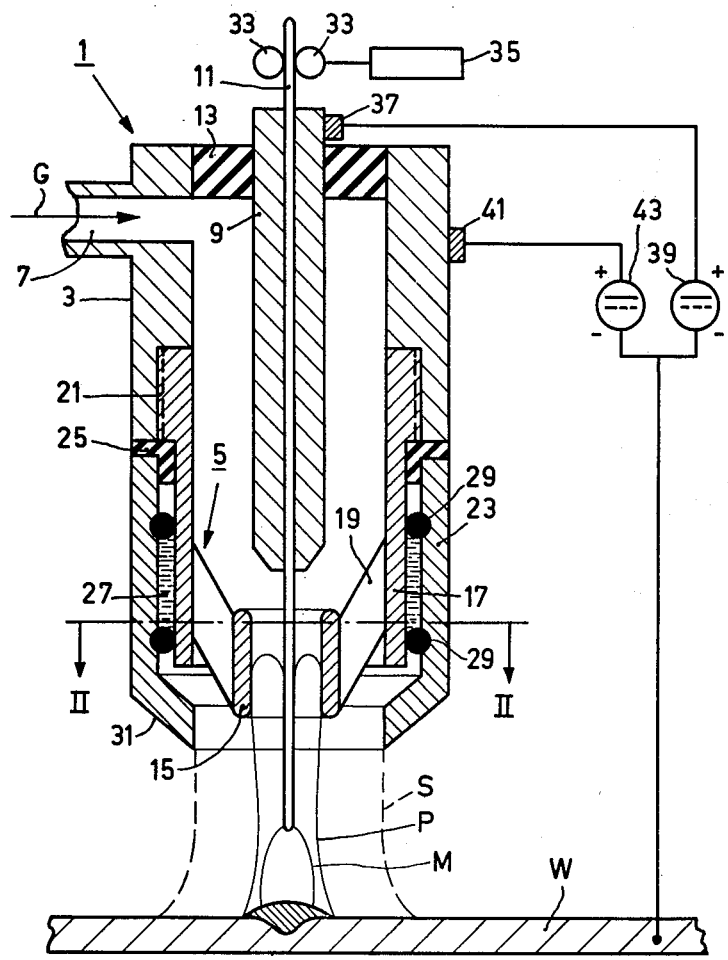

United States Patent [19]

Willems

[11] 4,234,779
[45] Nov. 18, 1980

[54] METHOD OF AND DEVICE FOR PLASMA-MIG WELDING

[75] Inventor: Gerardus A. M. Willems, Eindhoven, Netherlands

[73] Assignee: U.S. Philips Corporation, New York, N.Y.

[21] Appl. No.: 862,008

[22] Filed: Dec. 19, 1977

[30] Foreign Application Priority Data

Jan. 31, 1977 [NL] Netherlands ......................... 7700971

[51] Int. Cl.³ .............................................. B23K 9/00
[52] U.S. Cl. .................................. 219/121 P; 219/74; 219/76.16
[58] Field of Search ............. 219/74, 121 P, 75, 76.16; 313/231.4

[56] References Cited

U.S. PATENT DOCUMENTS

| | | | |
|---|---|---|---|
| 3,270,179 | 8/1966 | Russell | 219/74 |
| 3,794,806 | 2/1974 | Klasson | 219/121 P |
| 3,832,513 | 8/1974 | Klasson | 219/121 P |

FOREIGN PATENT DOCUMENTS 2449795 5/1975 Fed. Rep. of Germany ....... 219/121 P
1444880 8/1976 United Kingdom ................. 219/121 P

OTHER PUBLICATIONS

"Plasma Mig Welding", Welding and Metal Fabrication, Dec. 1974, pp. 417-419, Essers et al.

Primary Examiner—B. A. Reynolds
Assistant Examiner—M. Paschall
Attorney, Agent, or Firm—Thomas A. Briody; William J. Streeter; Rolf E. Schneider

[57] ABSTRACT

Plasma-MIG welding in which a thermally ionizable inert gas stream is flowed through a nozzle non-consumable electrode having a central aperture and a surrounding annular aperture toward a workpiece and is thereby split into a central gas column enveloped by an annular gas shield. A consumable electrode is fed through the central gas column toward the workpiece, with the establishment of a MIG-arc therebetween. A plasma arc is spontaneously established by means of the MIG-arc between the nozzle non-consumable electrode and the workpiece.

4 Claims, 2 Drawing Figures

METHOD OF AND DEVICE FOR PLASMA-MIG WELDING

This invention relates to a method of and a device for plasma-MIG welding in which a MIG-arc is maintained between a consumable electrode and a workpiece in a gas plasma which is enveloped by a shielding gas and which is generated by a plasma arc between a nozzle and the workpiece.

A method of this kind is known from U.S. Pat. No. 4,016,397 according to this known method, the shielding gas which serves to envelop the gas plasma is separately supplied via an annular chamber which is bounded by a cover which surrounds the housing of the welding torch. The plasma gas is applied directly, via the housing, through the plasma aperture of the nozzle, the nozzle serving as the non-consumable electrode for the plasma arc.

The quality of the gas shield, i.e. the absence of air therein, governs the stability of the welding process and the quality of the weld. Contamination by air causes serious instability of the plasma arc and poor, possibly porous welds. Therefore, careful attention must be paid to the supply of the shielding gas, which often results in complex constructions.

Present invention has for its object to provide a method where on the one hand reliable shielding of the plasma arc against the ingress of air and improvement of the welding process are obtained, whilst on the other hand a simple and compact torch construction is possible.

This object is achieved in accordance with the invention mainly in that a gas of the same composition is used for the plasma gas as well as for the shielding gas, said gas being supplied as a common gas flow which is split into a central column of plasma-forming gas and an envelope of shielding gas in the region of the nozzle.

A pure and uninterrupted jacket of shielding gas is obtained by the method in accordance with the invention. Contrary to the known method, no complex construction is required and the shielding gas envelope is supplied parallel to the plasma gas column, which results in improved shielding against contamination by air. Moreover, it has been found that the supply of the shielding gas and the supply of the plasma gas in a common gas flow offer better damping of pressure variations of the plasma gas and more stable adherence of the plasma arc to the non-consumable electrode.

For the welding of aluminium, argon can be used as the shielding gas as well as the plasma gas. For the welding of steel, an oxidizing gas, for example, a mixture of argon and carbon dioxide or a mixture of argon, carbon dioxide and oxygen should be used.

The invention also provides a plasma-MIG welding torch, for performing the above method, comprising a housing with a nozzle provided with a plasma aperture, a gas inlet and a contact tube in the housing; in accordance with the invention, this welding torch is characterized in that the nozzle consists of a central electrode ring which is connected, by ribs extending radially therefrom, to a support mounted on the housing.

In the nozzle, the gas flow is split into a column of plasma-forming gas, flowing through the centre of the electrode ring, and an envelope of shielding gas which flows through the openings present between the ribs. The ribs serve for power supply to, as well as for the discharge of heat from the electrode ring. On the one hand, the ribs and the electrode ring must be as thin as possible in order to ensure a uniform, air-free flow of the shielding gas around the plasma column. On the other hand, the construction of the electrode ring must be sufficiently heavy that enough heat capacity is available adequately to take up the heat generated in the event of local adherence of the plasma arc to the electrode ring. Further, the cross section of the ribs must be large enough to enable discharging of the heat generated in the electrode ring, so that the temperature of the electrode ring remains below a permissible value. The entire nozzle is preferably made of copper.

Thanks to its compact construction, the welding torch in accordance with the invention is particularly suitable for use as a light-weight hand torch.

Preferably, the ribs and the electrode ring are aerodynamically profiled in order to reduce turbulences in the shielding gas envelope. In a preferred embodiment of the welding torch in accordance with the invention, any turbulence caused by the ribs is at least reduced and the homogeneity of the shielding gas envelope is improved by a gas guide in the region of the electrode ring for guiding gas passing between the ribs around the electrode ring. The gas conductor is electrically insulated from the housing and is preferably also made of copper.

The heat discharged via the ribs on the electrode ring is transferred by the support to the housing which is usually water-cooled. The cooling of the electrode ring in a further preferred embodiment of the welding torch in accordance with the invention is further improved by a cooling water passage provided between the gas guide and the support. The support then serves as a heat sink and provides fast discharging of heat.

Figure 2:
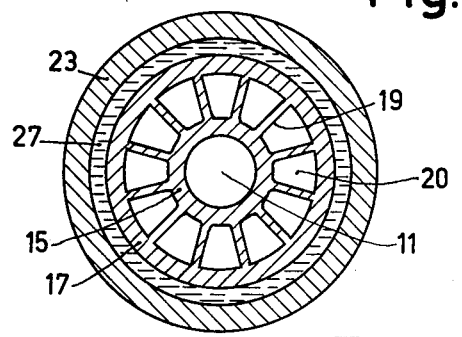

The invention will now be described in detail with reference to the accompanying drawing, in which:

FIG. 1 is a longitudinal sectional view, partly schematic, of a welding torch in accordance with the invention, and FIG. 2 is a cross-sectional view of the welding torch, taken along the line II—II in FIG. 1.

The welding torch 1 shown in FIGS. 1 and 2 comprises a housing 3 with a nozzle 5 and a gas inlet 7. In the housing 3 there is provided a contact tube 9 which serves for the guiding of, and the transfer of current to a welding wire 11 to be deposited. The contact tube 9 is electrically insulated from the housing 3 by an insulating ring 13. The nozzle 5 consists of a central electrode ring 15 which serves as a non-consumable electrode for the plasma arc, a support 17 which serves as a heat sink, and a number of regularly spaced ribs 19 extending radially from the electrode ring 15 to the support 17 in a spiderlike manner and which mechanically, thermally and electrically connect the electrode ring 15 to the support 17.

The support 17 is in turn mechanically, thermally and electrically connected to the housing 3 by means of a screwed connection 21. The nozzle 5 is surrounded by a mainly tubular gas guide 23 which is electrically insulated from the housing 3 by a ring 25 of a synthetic material and surrounds the support 17 with a clearance. Between the gas guide 23 and the support 17 a cooling water passage 27 is formed which is sealed by means of sealing rings 29 which also serve for the electrical insulation of the gas guide 23 from housing 3. The cooling water passage 27 communicates with connections (not shown) for the supply and discharge of cooling water. The gas guide 23 has a truncated conical end 31 which extends beyond the electrode ring 15, viewed in the axial direction. The welding wire 11 is supplied by means of transport rollers 33 which are driven by a variable speed motor 35. The contact tube 9 includes a connection terminal 37 for electrical connection to one of the poles of a first power supply source 39, the other pole of which is connected to a workpiece W. The electrode ring 15 is connected, by way of a connection terminal 41 on the housing 3, to one of the poles of a second power supply source 43, the other pole of which is also connected to the workpiece W.

For the welding of the workpiece W, a gas flow G is supplied via the gas inlet 7 through the housing 3 in the direction of the nozzle 5. Subsequently, the welding wire 11 is supplied and a MIG-arc M is struck between the welding wire 11 and the workpiece W, for example, by bringing the welding wire momentarily into contact with the workpiece. A plasma arc between the electrode ring 15 and the workpiece W is then spontaneously ignited by the MIG-arc. In the nozzle 5, the gas flow G is split into two parallel sub-flows by the electrode ring 15 and the ribs 19: i.e. a central gas column which is ionized, after ignition of the plasma arc between the electrode ring 15 and the workpiece W, to form the gas plasma P, and an annular envelope S of relatively cold, non-ionized sheating or shielding gas which flows through the openings 20 between the ribs 19 and which envelops and surrounds the gas plasma P. The gas guide 23 compensates for any turbulences in the shielding gas S, caused by the ribs 19, and prevents the drawing of air into the shielding gas flow.

The ribs 19, via which the current is supplied to the electrode ring 15, also serve to discharge the heat from the electrode ring 15 to the support 17 which serves as a heat sink.

What is claimed is:

1. A method of plasma-MIG welding, which comprises providing a single nozzle non-consumable electrode having a central aperture and a surrounding annular aperture; flowing a thermally ionizable gas stream from a common gas source through said single nozzle non-consumable electrode toward a workpiece, said single nozzle splitting said gas stream into a central gas column surrounded by a parallelly flowing annular gas sheath, said annular gas sheath and said central gas column having the same composition as they flow past the outlet of said single nozzle; feeding a consumable electrode through said central gas column toward the workpiece; first establishing a MIG-arc between said consumable electrode and said workpiece; and then spontaneously establishing a plasma arc by means of said MIG-arc between said single nozzle non-consumable electrode and said workpiece to ionize said central gas column and sustain a plasma flow enveloping said MIG-arc, the surrounding annular gas sheath remaining non-ionized.

2. A plasma-MIG welding torch, which comprises a cylindrical housing; a cylindrical support electrically connected to the interior of said cylindrical housing; a single nozzle non-consumable electrode positioned adjacent one end of said cylindrical support, said single nozzle comprising a central ring and a plurality of ribs extending radially from said central ring to said cylindrical support and providing electrical connection therebetween; means for flowing a thermally ionizable gas stream from a common gas source through said single nozzle non-consumable electrode toward a workpiece to thereby split said gas stream into a central gas column surrounded by a parallelly flowing annular gas sheath both having the same composition as they flow past the single nozzle outlet; means for feeding a consumable electrode through said central gas column toward the workpiece; a first circuit means consisting basically of said consumable electrode, a first power supply, and said workpiece for establishing a MIG-arc between the consumable electrode and the workpiece; and a second circuit means consisting basically of a second power supply, said single nozzle non-consumable electrode, and said workpiece for establishing a plasma arc between the single nozzle non-consumable electrode and the workpiece to ionize said central gas column and sustain a plasma flow enveloping said MIG-arc without ionizing the surrounding annular gas sheath.

3. A plasma-MIG welding torch according to claim 1, which includes means in the region of the single nozzle non-consumable electrode for guiding the portion of the gas stream passing around the central ring to assist in the formation of the surrounding annular gas sheath.

4. A plasma-MIG welding torch according to claim 2, in which said guiding means is electrically insulated from the cylindrical support and also spaced outwardly thereof, and which includes cooling water in the space between said guiding means and said cylindrical support.

* * * * *